May 10, 1966 J. T. MELICHAR ETAL 3,250,670
APPARATUS FOR FORMING ASBESTOS-CEMENT TUBES
Original Filed Dec. 28, 1962 2 Sheets-Sheet 2
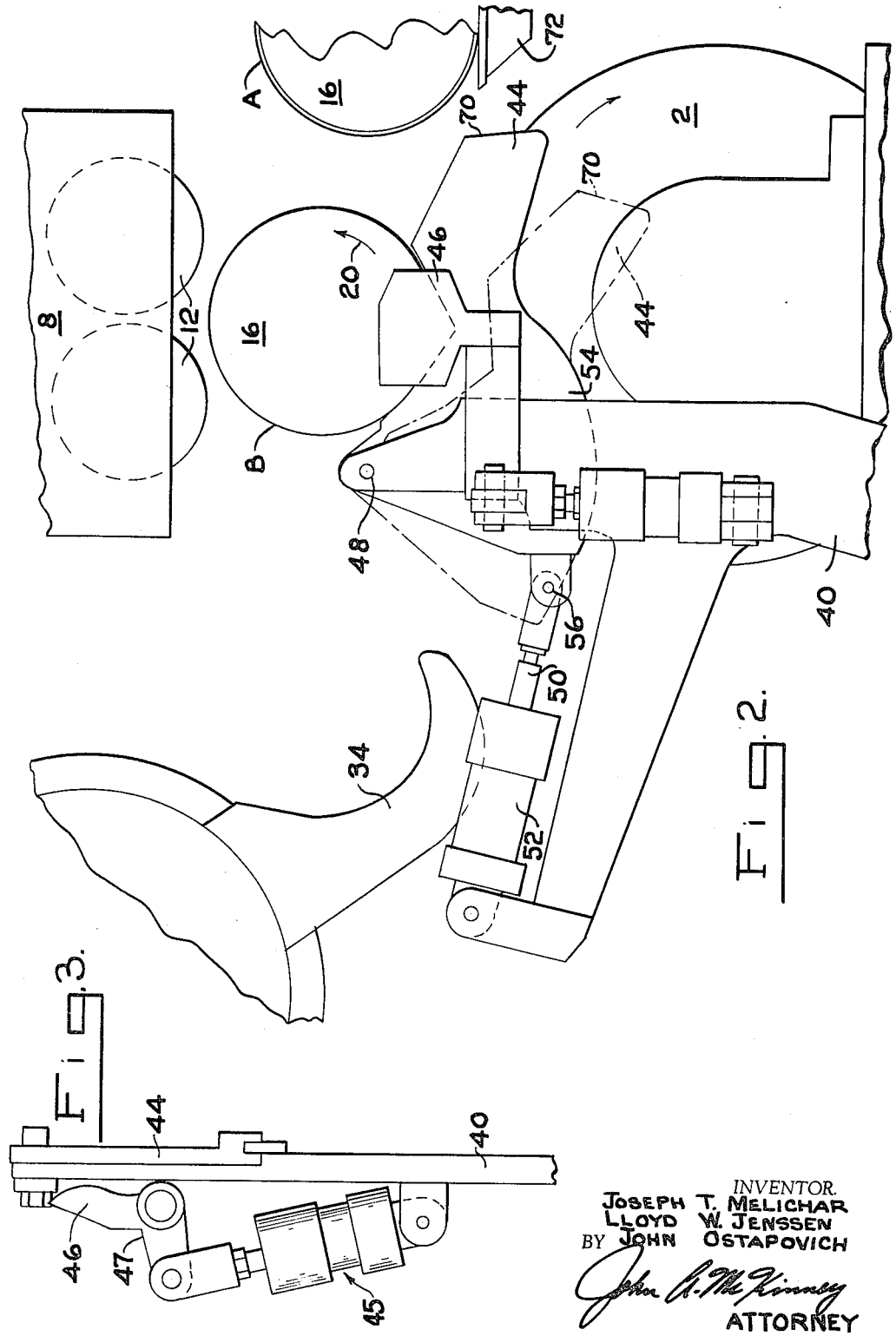
INVENTOR.
JOSEPH T. MELICHAR
LLOYD W. JENSSEN
BY JOHN OSTAPOVICH
John A. McKinney
ATTORNEY 3,250,670
APPARATUS FOR FORMING ASBESTOS-
CEMENT TUBES
Joseph T. Melichar, Dunellen, Lloyd W. Jenssen, Somerville, and John Ostapovich, East Brunswick, N.J., assignors to Johns-Manville Corporation, New York, N.Y., a corporation of New York
Continuation of application Ser. No. 247,933, Dec. 28, 1962. This application Oct. 1, 1965, Ser. No. 496,238
5 Claims. (Cl. 162—284)

This application is a continuation of application Serial No. 247,933 filed December 28, 1962, now forfeited.

This invention relates to apparatus for use in forming asbestos-cement products and is particularly directed to apparatus for use in the formation of asbestos-cement pipe and for effecting a separation of the asbestos-cement stock in the manufacture of asbestos-cement pipe utilizing a process wherein wet asbestos-cement stock is collected on a rotating mandrel.

In the manufacture of asbestos-cement products and in particular the manufacture of asbestos-cement pipe utilizing a system such as that described in Swensen, U.S. Patent No. 3,000,776 and Rembert, U.S. Patent No. 2,322,592, a felt is arranged to pick up a wet asbestos-cement stock which is then collected on a rotating mandrel. One of the problems involved in the manufacture of asbestos-cement pipe in a system as disclosed above resides in the moving of a mandrel into and out of pipe forming position in the pipe forming apparatus. In the systems illustrated in Swensen and Rembert, it is necessary to stop the movement of the felt carrying the layer of wet asbestos-cement stock in order to effect a change of the mandrels. Therefore, it is essential in a system of this nature that the mandrels be changed as rapidly as possible to minimize the stoppage time of the felt. Also, when a wall thickness of a predetermined amount has been built up on a rotating mandrel, it is necessary to effect a separation of the stock between the felt and the mandrel. Many difficulties have been encountered in obtaining a clean separation of the stock between the felt and the mandrel in the manufacture of asbestos-cement products when the mandrel with the formed stock thereon is removed for further processing.

It is an object of the instant invention to provide apparatus for effecting the movement of a mandrel out of and into pipe forming position in the manufacture of asbestos-cement pipe.

It is a further object of the instant invention to provide apparatus for effecting a separation of the asbestos-cement stock between the felt and the mandrel in the manufacture of asbestos-cement products.

The foregoing objects are accomplished in accordance with the instant invention by a combination of elements which cooperate to move the mandrels out of and into pipe forming position while at the same time effecting a separation of the asbestos-cement stock between the felt and the mandrel in the manufacture of asbestos-cement pipe. In the preferred embodiment of the instant invention, a plurality of mandrels are fed in sequence from a return conveyor to a let-down conveyor and are deposited from this let-down conveyor in sequence to a position in the notched supports of each of a pair of cooperating pivoted arms. After an empty mandrel has been positioned in the notched supports of the pivoted arms, these arms are actuated to move the empty mandrel into pipe forming position on the anvil roll of a pipe forming machine. The empty mandrel is held in position on the anvil roll by the notches in the pivoted arms until the upper press mechanism of the pipe forming machine is lowered into pipe forming position and the empty mandrel is retained in a rotatable position between the press rolls and the anvil roll while the asbestos-cement stock from the felt is laminated on the mandrel. After the formation of the pipe on the mandrel has been initiated, the notched support of each of the pivoted arms is moved out of contact with the mandrel and the pivoted arms are returned to a position adjacent the let-down conveyor to be in position to receive the next empty mandrel. When the asbestos-cement stock on the mandrel has reached a desired wall thickness, the forming operation is stopped and the press rolls are raised. The movement of the pivoted arms is again initiated and the leading edge of each of the notched supports of the pivoted arms contacts the free ends of the mandrel on which an asbestos-cement pipe has just been formed to impart to the mandrel and the asbestos-cement pipe thereon lifting, rotational and pushing forces to move said mandrel with said asbestos-cement pipe thereon through a linear distance while imparting a rotational movement thereto so as to move the mandrel from the pipe forming position and at the same time to effect a separation of the stock between that on the felt and that on the mandrel. The mandrel with the asbestos-cement stock formed thereon is then moved by suitable mechanisms for further processing.

The invention will be more fully understood and further objects and advantages thereof will become apparent when reference is made to the following detailed description of a preferred embodiment of the invention and the accompanying drawings in which:

FIG. 2 is an enlarged view of a portion of the apparatus of FIG. 1 showing the position of these elements when depositing an empty mandrel onto the anvil roll; and FIG. 3 is a side view of FIG. 2 with parts removed.

Figure 1:
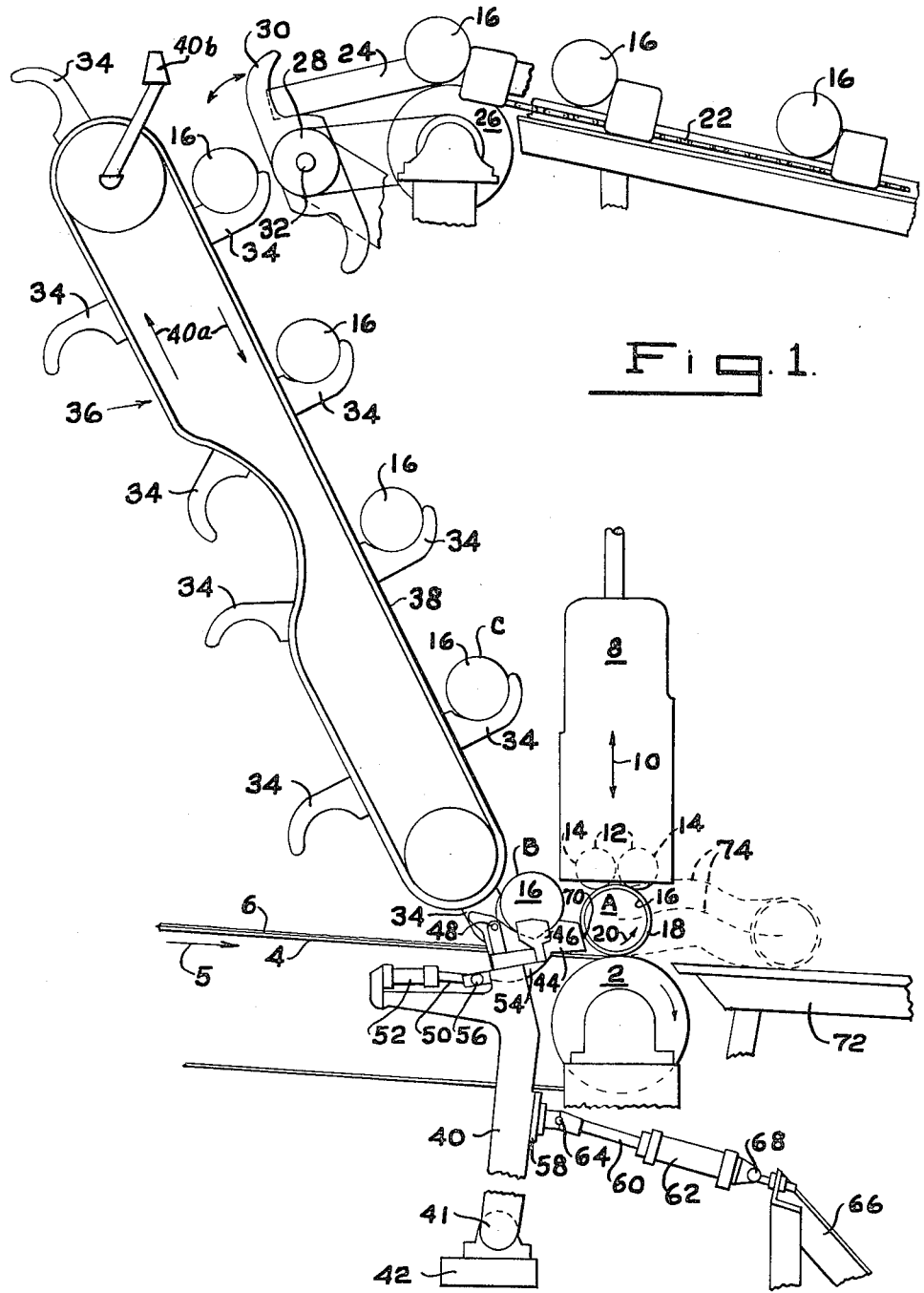
FIG. 1 is a side elevation of a schematic representation of apparatus of the instant invention showing the position of the apparatus when in pipe forming position.

Referring to the drawing, there is illustrated in FIG. 1, an anvil roll 2 over which there travels a felt 4 arranged to pick up a wet-laid stock 6 from a cylinder mold (not shown) of a conventional machine of the type shown in the aforesaid Rembert patent. The anvil roll 2 is a rigid element capable of withstanding pipe forming pressures without flexing, and is rotated by a conventional means (not shown) to drive the felt 4 in the direction of the arrow 5. Positioned above the anvil roll is an upper press section, generally designated 8, moving toward and away from the anvil roll 2 in the directions indicated by the arrow 10. The press section 8 comprises a pair of rotatably mounted press rolls 12 having a peripheral surface 14 formed from a resilient material such as neoprene or other rubber-like material preferably of a hardness in the order of 55 durometer. As illustrated in FIG. 1, a mandrel 16 is positioned between the press rolls 12 and the anvil roll 2 and rotated in a direction indicated by the arrow 20. As the mandrel 16 is rotated, an asbestos-cement pipe 18 is formed on the peripheral surface thereof from the wet-laid stock 6 of asbestos-cement carried by the felt 4.

In FIG. 1, there is illustrated a portion of the return conveyor and the let-down conveyor which are utilized to supply empty mandrels for movement into the pipe forming machine. A plurality of mandrels 16 are moved by the return conveyor 22 comprising a pair of spaced endless chains to a pair of inclined rails 24 and deposited thereon as the endless chains of the conveyor 22 move over a pair of spaced rolls 26. The mandrels 16 are urged by gravity over the rails 24 until they contact a rotatable transfer mechanism 28. The transfer mechanism comprises at least one pair of supporting members 30 adapted to contact the ends of the mandrel 16 on the rails 24 and arranged for rotation about the shaft 32.

In FIG. 1, there are illustrated two supporting members 30 on each rotatable transfer mechanism 28. However, it is within the scope of this invention that any number of supporting members 30 may be associated with the transfer mechanism 28, the number being dependent only upon the type of indexing desired. As a mandrel 16 contacts the supporting members 30, an electric switch (not shown) is actuated and the supporting members 30 are rotated so as to deposit the mandrel 16 on the brackets 34 of the let-down conveyor 36.

The let-down conveyor 36 comprises a pair of endless chains 38 to which are secured at spaced intervals the brackets 34. The chains 38 are driven in the direction indicated by the arrows 40(a) by a synchronous drive means 40(b) so that the brackets 34 on each chain may cooperate to support a mandrel 16. At the lower end of the let-down conveyor 36, the brackets 34 pass between a pair of pivoted arms 40 each of which is pivotally mounted at 41 to a fixed base 42. Each arm 40 is provided with a notched support 44 which is secured to the pivoted arm 40 for movement therewith and is adapted to receive an associated end of an mandrel 16. Pivotally attached to each support 44 and cooperating therewith are a pair of guides 46 pivotally mounted at 47 adapted to contact the ends of each mandrel 16 to insure that each mandrel is in proper position for deposition onto the anvil roll 2 in pipe forming position. The relative position of each of the guides 46 is controlled by a piston and cylinder means 45. The notched support 44 is pivotally secured to the arm 40 at 48. A piston 50 operating in the cylinder 52 and connetced to lever arm 54 by pivot 56 controls the relative position of each of the notched supports 44. It is noted that each of the piston and cylinder means for controlling the location of the various pivoted elements is connected to appropriate hydraulic control means (not shown) which operate in response to electrical limit switches (not shown) controlled by the movement of the elements.

The pivoted arms 40 are connected to each other for simultaneous movement by a beam 58. At approximately its midpoint, the beam 58 is connected by pivot means 64 to a piston 60 operating in the cylinder 62. The cylinder 62 is secured to a fixed support 66 by pivot means 68.

The leading portion of each notched support 44 is provided with a surface 70 which, as it contacts the surface of the mandrel 16 on the anvil roll 2, forms an acute angle with the plane passing through the longitudinal axes of the anvil roll 2 and the mandrel 16 when in pipe forming position. In the preferred embodiment of the invention, this angle is approximately 30°. The surface 70 of each support 44 contacts the surface of the mandrel adjacent the ends thereof after the press rolls have been raised to a nonpipe forming position and the asbestos-cement pipe 18 has been formed on the other portions of the peripheral surface of the mandrel 16. The action of the surface 70 imparts to the mandrel 16, with the asbestos-cement pipe 18 formed thereon, a lifting, rotational and pushing force to move the mandrel 16 with the asbestos-cement pipe formed thereon through a linear distance while imparting a rotational movement thereto to effect a separation of the stock between the stock remaining on the felt 4 and the stock laminated on the mandrel 16. The mandrel 16 with the asbestos-cement pipe 18 formed thereon moves from the anvil roll 2 to the conveyor table 72 under the lifting, rotational and pushing forces applied by the support 44 through the surface 70 along the path indicated generally by the dotted lines 74. The mandrel 16 with the asbestos-cement pipe 18 formed thereon then moves over the conveyor table 72 for further processing.

The operation of the apparatus is best described in relationship to FIGS. 1 and 2 which illustrate the different positions of the apparatus during the movement of the mandrels through the system so as to have asbestos-cement pipe formed thereon. As illustrated in FIG. 1, the mandrel A is in position between the press rolls 12 and the anvil roll 2 and a layer of asbestos-cement from the wet laid stock 6 carried by the belt 4 has been laminated thereon to form a pipe 18. An empty mandrel B has been deposited by the let-down conveyor 36 into the notched supports 44. Each support 44 is in a position with the surface 70 thereof adjacent the free end of the mandrel A. When the thickness of the asbestos-cement being laminated on the mandrel reaches a predetermined limit, a tripping mechanism (not shown) moves the press section 8 to a nonpipe forming position. As the press section 8 moves upwardly, a tripping mechanism (not shown) is actuated to control the piston 60 through the cylinder 62 and move the pivoted arms 40 in a direction toward the anvil roll 2.

As the surfaces 70 of the supports 44 contact the free ends of the mandrel A, they impart thereto lifting, rotational and pushing forces so as to move the mandrel from the pipe forming position on the anvil roll 2 to a position on the conveyor table 72. The surfaces 70 contact the mandrel A so as to lift the mandrel A from the anvil roll 2 and impart a linear movement to the mandrel and at the same time to impart thereto a rotational movement. The combination of these movements effects a clean separation of the stock between that on the felt and that on the mandrel. The direction of movement of the mandrel A from the position on the anvil roll 2 to the position on the table 72 is shown by the dotted lines 74.

As the mandrel A is being moved from the position on the anvil roll 2 to the conveyor table 72 by the action of the surfaces 70, the movement of the notched supports of the arms 40 is continued so as to deposit the mandrel B in the position on the anvil roll 2 vacated by the mandrel A. When the notched supports 44 of the arms 40 have reached a position so as to deposit the mandrel B in proper position over the anvil roll 2, as illustrated in FIG. 2, a tripping mechanism (not shown) is actuated so as to move the press section 8 downwardly into pipe forming position with the press rolls 12 in contact with the peripheral surface of the mandrel B. The guides 46 are then moved outwardly and the notched supports 44 are pivoted away from the supporting position, as indicated by the dotted outline in FIG. 2, and the mandrel B is supported in proper pipe forming position, i.e., on the anvil roll 2 and between the press rolls 12. The arms 40 are then moved back into a position under the let-down conveyor 36 so as to receive the next empty mandrel C. These operations are repeated in sequence so as to deposit, at proper periodic intervals, new mandrels in proper position on the anvil roll 2 so that asbestos-cement pipe may be formed thereon and the mandrels with asbestos-cement pipe 18 thereon may be removed for further processing.

From the foregoing explanation of the operation of the apparatus of the instant application, the advantageous results derived from such apparatus are readily apparent. The movement of the notched supports of the arms 40 through the surfaces 70 moves the mandrel A from the pipe forming position on the anvil roll 2 to a position on the table 72 while at the same time effecting a clean separation of the asbestos-cement stock between that on the felt 4 and that collected on the mandrel A. Also, at the same time an empty mandrel B is deposited on the anvil roll 2 so as to be ready to be moved into proper position on the anvil roll 2 and between the press rolls 12 so that an asbestos-cement pipe 18 may be formed thereon. Thus, the movement of the arms 40 accomplishes the removal of the mandrel A, the separation of the stock between the felt 4 and the mandrel A and the insertion of a new mandrel B in one simultaneous operation. Thus, this process as carried out by the apparatus of the instant application operates to pass the mandrels through the pipe forming operation with a minimum of time between each operation.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. Apparatus for forming asbestos-cement pipe wherein a continuous layer of asbestos-cement stock carried by a moving felt is wrapped around a mandrel to form a plurality of laminations thereon while said mandrel is supported on an anvil roll comprising:
   (a) means for forming a plurality of laminations of said asbestos-cement stock carried by said felt on a mandrel supported on an anvil roll,
   (b) means for providing a plurality of mandrels for sequential feeding into said supported position on said anvil roll, and
   (c) means for simultaneously moving said mandrel with said asbestos-cement stock thereon out of said supported position on said anvil roll; effecting a separation of said stock between the stock remaining on said felt and the stock laminated on said mandrel; and depositing another mandrel into said supported position on said anvil roll and in position to have asbestos-cement stock laminated thereon, said means for simultaneously moving said mandrel including:
      (1) a pair of arms,
      (2) means connected to said arms for supporting the ends of said another mandrel and for contacting the ends of said mandrel with asbestos-cement stock laminated thereon to impart movement thereto, and
      (3) means for moving said arms to effect simultaneously the movement of said mandrel with said asbestos-cement stock thereon out of said supported position on said anvil roll; the separation of said stock between the stock remaining on said felt and the stock laminated on said mandrel; and the deposition of said another mandrel into said supported position on said anvil roll in position to have asbestos-cement stock laminated thereon.

2. The apparatus as defined in claim 1 wherein said means for contacting the ends of a mandrel with asbestos-cement stock laminated thereon to impart movement thereto comprises:
   (a) a surface on the leading portion of said means connected to said arms for supporting the ends of said another mandrel, said surface contacting said ends of said mandrel with asbestos-cement stock laminated thereon to impart lifting, rotational and pushing forces thereto.

3. Apparatus as defined in claim 1 wherein said means for providing a plurality of mandrels for sequentially feeding into said supported position on said anvil roll comprises:
   (a) a pair of endless chains,
   (b) means attached to each of said chains for supporting one end of a mandrel, and
   (c) means for moving said chains to deposit a mandrel onto said means of each of said arms for supporting an end of a mandrel.

4. Apparatus as defined in claim 2 wherein:
   (a) said arms are pivotally mounted, and
   (b) said means connected to said arms for supporting the ends of a mandrel and for contacting the ends of a mandrel with asbestos-cement stock laminated thereon to impart lifting, rotational and pushing forces thereto are pivotally connected to said arms.

5. Apparatus as defined in claim 4 and further comprising:
   (a) means on each of said pivoted arms for contacting the axial extremities of a mandrel to position said mandrel for proper location in said supported position on said anvil roll.

References Cited by the Examiner

UNITED STATES PATENTS

| | | | |
|---|---|---|---|
| 2,937,701 | 5/1960 | Toniolo et al. | 162—284 |
| 2,961,729 | 11/1960 | Colliva | 162—284 |
| 2,977,276 | 3/1961 | Colliva | 162—284 |
| 3,003,553 | 10/1961 | Colliva | 162—284 |

DONALL H. SYLVESTER, *Primary Examiner.*

S. LEON BASHORE, *Assistant Examiner.*